Figure 1:
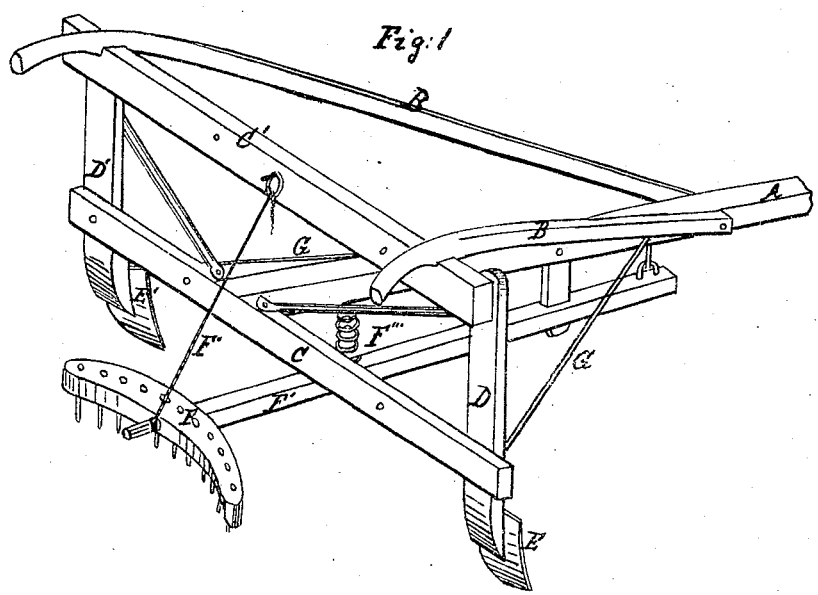

W. Frantz.
Cultivator.

Nº 73087        Patented Jan. 7, 1868.

Witnesses —
F. H. Sprague.
Chas. H. Clausen.

Inventor —
Wm Frantz
by D. P. Holloway &c
his attys —

United States Patent Office.

WILLIAM FRANTZ, OF PIQUA, OHIO.

Letters Patent No. 73,087, dated January 7, 1868.

---

IMPROVEMENT IN CULTIVATORS.

---

The Schedule referred to in these Letters Patent and making part of the same.

---

TO ALL WHOM IT MAY CONCERN:

Be it known that I, WILLIAM FRANTZ, of Piqua, in the county of Miami, and State of Ohio, have invented a new and useful Improvement in Cultivators; and I do hereby declare that the following is a full, clear, and exact description of the same, reference being had to the annexed drawing, in which the cultivator is shown in perspective.

This invention consists in so arranging the cultivator that it may be used for furrowing out, for covering the corn, and cultivating the growing corn, by the following devices:

A is the beam, to which the draught is attached; B, the handles fastened thereto. The cross-timber C is framed to the beam, and connected, by braces, with the parallel piece C'. The standards D D' are bolted to the cross-pieces C and C'. Two sets of holes are arranged in the cross-pieces, so that the standards, which carry the shovels E and E', may be set further apart or nearer to one another, as may be required. A rake, F, attached to a beam, F¹, is hinged to the bottom of the beam A. F² is a chain or cord for raising the rake to release any old cornstalks or other trash that may become entangled in the teeth of the rake. When the chain is loosened, after raising the rake, the latter is pressed down by a spring, F³, which also permits the rake to yield to an obstacle which might otherwise break it. G G are braces, supporting the strain on the ploughs and standards.

When it is desired to furrow out the ground, the standards D D' are set on the outer end of the cross-pieces C C', at the proper distance apart, and the rake is removed. To cover corn, the standards and ploughs are attached, by means of the inner series of holes, so that the earth may be thrown outwards by the shovel-ploughs to cover the grain. The rake is attached to break up the clods and pulverize the earth. When it is desired to cultivate the growing crop, the standards should be arranged as in covering, except that one standard should be bolted in front of, and the other behind, the cross-pieces C C', so that the ploughs may not be in the same line. This is done for the purpose of throwing off anything which, being caught by the shovels, if in line, and being dragged along, would injure the stalks of the growing corn. In cultivating, I take off the rake.

What I claim as my invention, and desire to secure by Letters Patent, is—

The combination of the standards D D' and shovel-ploughs E E', adjustably attached to cross-beams C C', and the adjustable rake F, arranged to operate substantially as set forth.

In testimony whereof, I have signed my name to this specification in the presence of two subscribing witnesses.

WILLIAM FRANTZ.

Witnesses:
N. F. WILBUR,
HENRY VON TUYL.